United States Patent [19]

DeVeau, Jr. et al.

[11] Patent Number: 5,278,932
[45] Date of Patent: Jan. 11, 1994

[54] OPTICAL FIBER SPLICE VERIFICATION SYSTEM

[75] Inventors: George F. DeVeau, Jr., Stone Mountain; Walter S. Konik, Lilburn; Joel L. Mock, Norcross, all of Ga.

[73] Assignee: AT&T Bell Laboratories, Murray Hill, N.J.

[21] Appl. No.: 954,089

[22] Filed: Sep. 30, 1992

[51] Int. Cl.$^5$ ............................................. G02B 6/00
[52] U.S. Cl. ............................ 385/134; 250/227.24; 250/227.28
[58] Field of Search .................... 385/134, 97, 96, 95; 250/227.24, 227.28

[56] References Cited

U.S. PATENT DOCUMENTS

| | | | |
|---|---|---|---|
| 4,191,446 | 3/1980 | Arditty et al. | 250/227.24 X |
| 4,452,506 | 6/1984 | Reeve et al. | 250/227.24 |
| 4,475,789 | 10/1984 | Kahn | 385/95 |

Primary Examiner—Frank Gonzalez
Assistant Examiner—Stephen W. Barns
Attorney, Agent, or Firm—Donald E. Hayes, Jr.

[57] ABSTRACT

The splice verification system of the present invention verifies the efficiency of an optical splice by measuring the scattered light escaping from the splice. Specifically, the preferred embodiment performs such scattered light measurement within a photodetection area which is substantially free of all ambient light. Furthermore, the verification system includes a reference power module which, prior to creating an optical splice, measures the level of the optical signal being transmitted out of the end of an active fiber. The present invention then provides means to correlate the level gauged as a reference signal level relative to the amount of scattered light lost from the optical splice. The ratio of these two measured light levels may then be used to determine whether the amount of scattered light lost from the optical splice is acceptable given the particular constraints of the optical system in which the splice is employed.

10 Claims, 3 Drawing Sheets

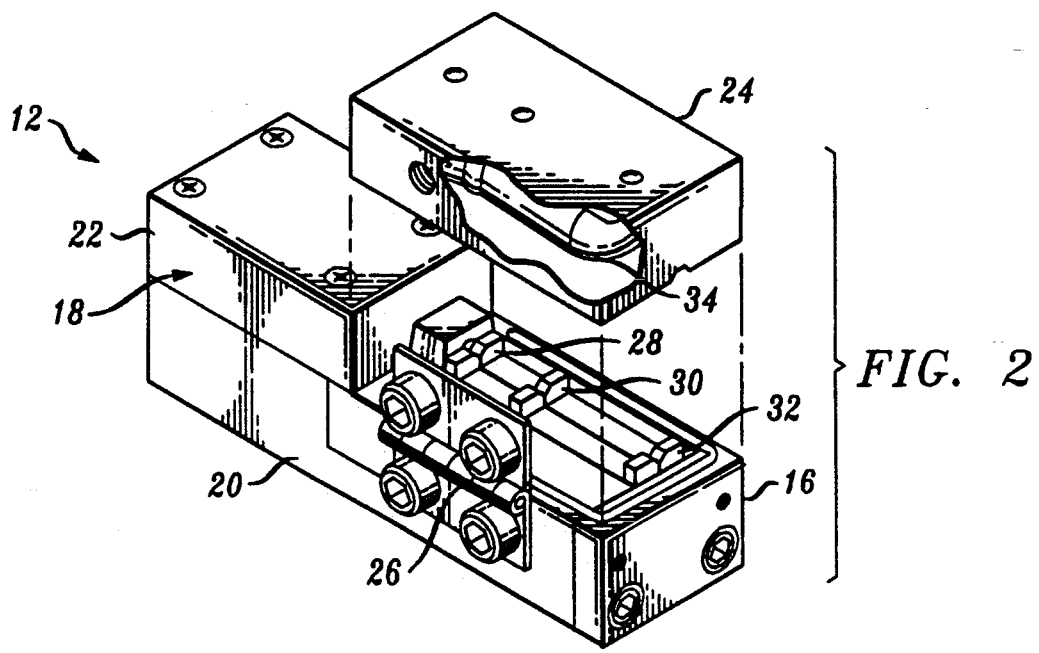
FIG. 2
FIG. 3
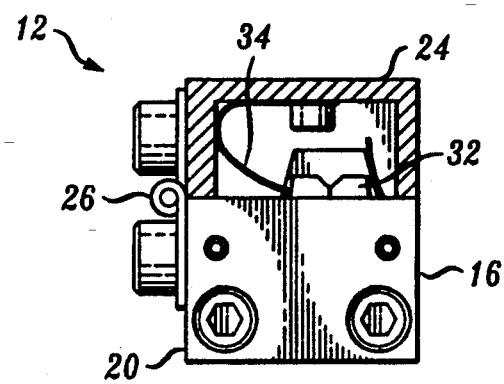

OPTICAL FIBER SPLICE VERIFICATION SYSTEM

TECHNICAL FIELD

This invention relates to an optical fiber splice verification system. More particularly, the invention relates to a system for providing splice optimization and loss measurement at the splice point.

BACKGROUND OF THE INVENTION

Optical fiber connectors and splicing devices are an important part of substantially any optical fiber communication system. For instance, connectors or splicing devices may be used to join segments of fiber into longer lengths or to connect fiber to active devices such as radiation sources, detectors, or repeaters, or to passive devices such as switches or attenuators. Considering that a core of multimode optical fiber is 50 microns in diameter and that of single mode fiber is only 8 microns, achieving a proper connection or splice is no small task. Due to the precision required to adequately join two optical fibers and the importance of such splices not introducing an unacceptable amount of loss into the communication system, verification of a proper connection would be beneficial.

A multimode fiber splicing technique presently exists which uses precision glass plugs to terminate fibers and a plastic ferrule to align and retain the plugs. A completed splice assembly of this technique assures its mechanical integrity by means of axial loading applied with coiled springs at the plug ends. In addition, the splice assembly is index matched with a curable gel. More specific details of such a splice are disclosed in commonly assigned U.S. Pat. No. 4,880,291 issued in the names of J. A. Aberson, G. F. DeVeau and K. M. Yasinski.

In the above-described connector or splice, a loss minima may be obtained by rotating plugs relative to each other. Some of the factors affecting the particular loss minima include 1) eccentricities caused by the position of the fiber core within the cladding; 2) the position of the fiber within the plug bore, and 3) the position of the bore relative to the plug outer diameter.

Two methods presently used to monitor splice loss during plug rotation are end-to-end transmission measurements and Optical Time Domain Reflectometer (OTDR) measurements. Using end-to-end transmission measurements to obtain a minimum splice loss requires that a source (light-emitting diode or laser) be used to energize the fiber to be spliced and that a suitable detector and power-measuring apparatus be located at the far end of the fiber to be spliced. For field splicing this would usually require a source in the central office and the detector (typically a power meter) at the splice point adjacent to the splice being made. Basic shortcomings with this method of splice optimization are the necessity of opening the adjacent manhole with two splicing teams required, the inability to accurately measure splice loss due to the fiber losses included in the measurement, and difficulties involving feeding back the transmitted power level to the splicer.

The OTDR method of splice alignment requires connection to the fiber to be spliced and a talk circuit between the OTDR and splicing crew. As the splice is aligned, the splice loss from the OTDR is reported to the splicer. This procedure of measuring and adjusting is repeated until the splice is optimized. Splice loss measured with unidirectional OTDR measurements is inaccurate due to fiber parameter differences. Accurate OTDR splice loss measurements require measurements from both directions and averaging. An additional disadvantage of OTDR is the associated low sampling rate. Yet another disadvantage of the OTDR is its range. With state-of-the-art equipment, only a relatively limited range may be allowed before the OTDR must be moved closer to the splice point.

In light of the above-identified problems with the present splice verifying technology, what is needed and what is seemingly not provided by the prior art is a dependable system capable of providing splice optimization and loss measurement at the splice point. The sought-after system should be usable to adjust or "tune" an optical fiber splice for minimum loss and continually indicate the amount of loss in decibels.

SUMMARY OF THE INVENTION

The foregoing problems of the prior art have been overcome by the optical fiber splice verification system of this invention. The splice verification system of the present invention verifies the efficiency of an optical splice by measuring the scattered light escaping from the splice. Specifically, the preferred embodiment performs such scattered light measurement within a photodetection area which is substantially free of all ambient light. Furthermore, the verification system includes a reference power module which, prior to creating an optical splice, measures the level of the optical signal being transmitted out of the end of an active fiber. The present invention then provides means to correlate the level gauged as a reference signal level relative to the amount of scattered light lost from the optical splice. The ratio of these two measured light levels may then be used to determine whether the amount of scattered light lost from the optical splice is acceptable given the particular constraints of the optical system in which the splice is employed.

BRIEF DESCRIPTION OF THE DRAWING

Other features of the present invention will be more readily understood from the following detailed description of specific embodiments thereof when read in conjunction with the accompanying drawings, in which:

FIG. 2 is a isometric, partially extended view of the reference power module in accordance with the present invention.

FIG. 3 is a side view of the reference power module of the present invention.

DETAILED DESCRIPTION

Figure 1:
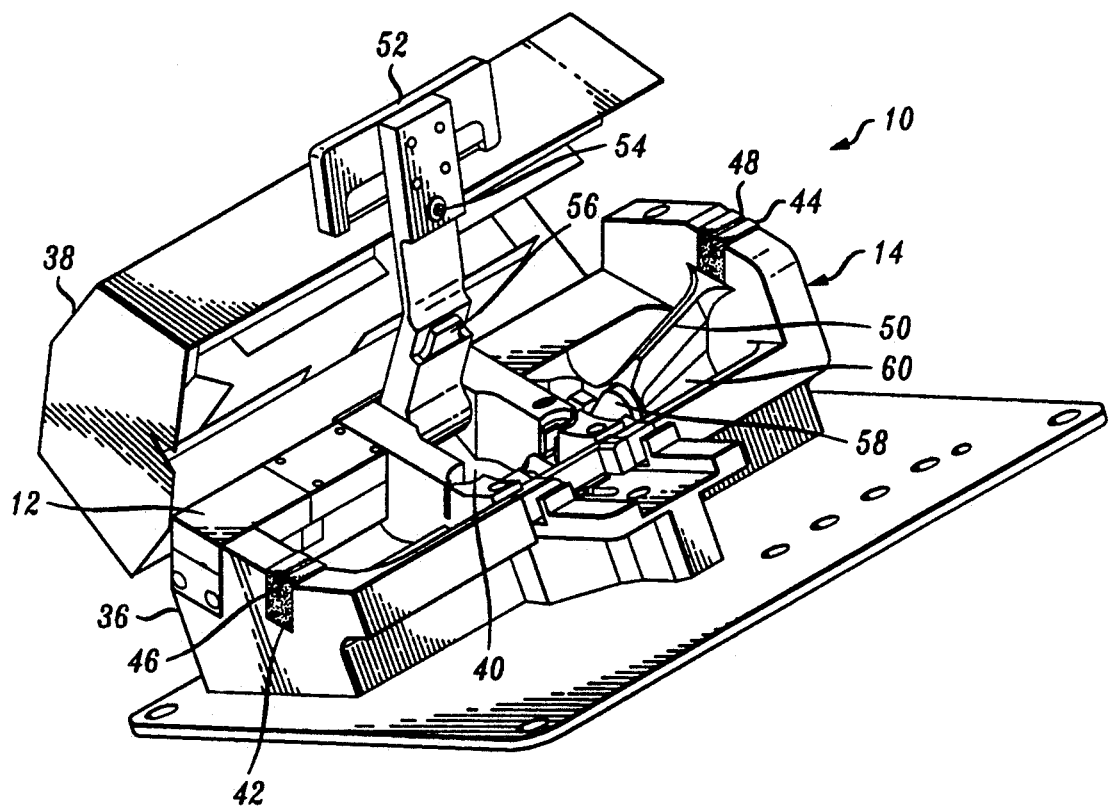
FIG. 1 is an isometric view of an optical fiber splice verification system in its open position in accordance with the present invention.

The preferred embodiment of an optical fiber splice verification system is depicted in FIG. 1 and generally identified by reference numeral 10. Structurally, the splice verification apparatus of the preferred embodiment of the present invention includes two distinct sections. The first section is referred to herein as the reference power module and is generally depicted as item number 12 in FIGS. 1-3. The second portion of the present testing apparatus is referred to herein as the verifier module and is generally identified by reference number 14 of FIG. 1.

As stated, the first distinct section of the testing apparatus of the present invention is the reference power module 12 of FIGS. 2 and 3. The purpose of the reference power module 12 is to accurately measure and record the light level being transmitted through an active optical fiber at the point to where a splice is desired. As shown in FIG. 2, the reference power module 12 comprises two sections, namely a fiber orientation section 16 and a reference light detection section 18. Furthermore, each of these sections is supported by a reference module base 20.

In general, the fiber orientation section 16 provides mechanical support for properly orienting and receiving the active fiber in its desired testing position. The light reference detection section 18 is immediately adjacent the fiber orientation section 16 and defines a detection area free of ambient light. Specifically, the light reference detection area includes a cover arrangement 22 which provides protection for a diode, not specifically shown, and whose operation will be discussed later. The diode cover 22 also prohibits undesired light from entering the detection area of the diode, thereby allowing the diode to only be exposed to light emitted from the end of the active fiber.

The fiber orientation section 16 is enclosed by a cover arrangement referred to herein as the reference module lid 24. The lid 24 attaches to the reference module base 20 via hinges 26 which allows for easy insertion of a fiber. Preferably, the fiber orientation section 16 includes fiber support means 28, 30 and 32 located under the lid 24 and attached to the reference module base 20 for providing a guide or track to assist in properly orienting the fiber within the reference power module 12. Specifically, one part 28 of the fiber guide means should act to support a bare-ended fiber an appropriate distance from the face of the diode, while a second part 32 of the fiber guide means assists in holding the buffered fiber portion in place. In addition to providing assistance in shielding the diode from extraneous light, the lid 24 includes a spring 34 positioned to apply a downward force to hold an inserted fiber being gauged in place within the fiber guide means.

After the reference power of the optical signal being input into the fiber splice has been gauged, the process of actually verifying the effectiveness of the optical coupling provided by the splice may begin. As illustrated in FIG. 1, the present invention provides an optical splice verification unit which mechanically includes a main body portion, generally designated by reference numeral 36, and a light-shielding cover assembly, identified as element 38.

The main body portion 36 contains a splice nest 40 which is preferably centrally located within the verification unit 14 for securely holding the splice (not shown) in the desired position. In the preferred embodiment of the present invention, the splice nest 40 is particularly designed to accept a CSL splice with its spring-side down. The longitudinal alignment of the CSL splice as positioned in the splice nest establishes a fiber placement path extending across the width of the main body portion 36.

To assist in maintaining the optical fiber within its desired position along the fiber placement path, each side of the main body portion is further equipped with fiber grips 42 and 44. In the preferred embodiment of the present invention, the fiber grips are foam blocks, each including an upwardly-oriented open slits 46 and 48. The slits 46 and 48 are aligned so as to be within the longitudinal fiber placement path and establish a point of fiber entry into the verification unit through both the left and right side wall of the unit. The foam grips 42 and 44 act to snugly hold the desired amount or length of optical fiber within the unit while prohibiting unwanted light to enter the unit through any points of fiber entry.

Furthermore, in order to allow easy insertion of a non-active bare-ended fiber into a secured splice, included in the main body portion 36 is a trough-like guide 50 which is longitudinally aligned with and in an end-to-end configuration with the splice. The trough-like guide 50 is preferably made of brass and angled upward so that the lowest end of the brass guide is adjacent the splice and the highest end of the guide is toward the side of the main body portion 36 near right-hand foam grip 44.

A light-shielding cover assembly 38 is preferably pivotally connected the main body portion 36 of the splice verification unit. The main purpose of the cover assembly 38 is to establish a dependable and easy-to-employ arrangement for substantially isolating the splice nest 40, and any optical fiber splice positioned therein, from undesired exposure to extraneous light. By purposely isolating the splice and detection unit from ambient light, basically any type of signal present in the active fiber may be gauged and utilized as a reference level. The particular signal in the active fiber need not be characteristically distinguishable from various parts of common light sources. In addition, the cover assembly should provide convenient operator access to the reference module 12, as well as to any splice positioned within the splice nest 40.

The cover assembly 38 is equipped with a handle 52, preferably extending from the front of the cover assembly, for the operator to use when opening and closing of the cover assembly. In the preferred embodiment of the present invention, the handle 52 may include a magnetic latching mechanism 54 to securely maintain the cover assembly in its closed position during the splice verification operation.

One additional feature of the cover assembly 38 is a splice-locking mechanism 56 which acts as the cover assembly is being closed to engage or lock the CSL splice within the splice nest. As described in greater detail in commonly-assigned U.S. Pat. No. 5,125,057, the CSL splice incorporates a clip spring which toggles between two positions. One position of the CSL splicing device opens the splice to allow fiber ends to be easily inserted and removed from the splice. Conversely, the second position arranges the clip spring in a manner that applies a pressure to the fiber ends which prohibits their removal from the splice.

The verification unit of the present invention allows a CSL splice in its open position to be placed in the splice nest 40. Various fiber ends may then be inserted within the splicing device as desired. When each fiber end is properly positioned within the splice, the cover assembly 38 is closed to in essence begin the splice verification process. As the cover assembly 38 is shut or moved to its measurement position, the previously opened CSL splice is manipulated into its closed position by the splice-locking mechanism 56. Once the splice is in its closed position, thereby securely holding two fiber ends together, the operator may further utilize the verification unit of the present invention to validate the optical operation of the newly created splice.

The initial step involved in using the present invention to properly verify an optical splice is to accurately measure the essential characteristics of the light energy being introduced into the splice created. By utilizing the reference power module 12 described above, the operator obtains an indication as to the amount of light supplied to the splice via the active fiber. The reference power module 12 of the present invention precisely captures and measures the amount of light transmitted through an active fiber at a point where an optical splice is to be created. Correspondingly, the verification unit of the present invention measures the amount of scattered light escaping from the optical splice incorporating that active fiber.

Then by establishing the ratio of the amount of lost light energy captured escaping from the splice relative to the level of energy being input into the splice, the operator can make a determination as to whether that degree of splice loss is within acceptable ranges. Should the splice loss measured not be acceptable, the CSL splice may be removed from the splice nest 40 of the verification unit, manipulated to its open position and adjustments made to the fiber ends to improve the splice connection. The above-described process for utilizing the verification unit of the present invention may then be repeated to close the CSL splice and verify its optical operation. This procedure may be repeated as many times as is necessary to establish an adequate optical splice.

Detailed below are the preferred procedural steps involved in employing the verification unit of the present invention to validate the optical operation of a CSL splice. First, the cover assembly is closed and the unit powered up to initiate a self-test routine, see FIG. 4, element 94. After the self-test is completed, an audible or visual signal may be used to indicate that the unit is operating properly and ready for operation, whereas a different series of audible or visual signals may signify a self-test failure. Upon successful completion of the self-test routine, the cover assembly 38 is opened and a CSL splice is positioned into the splice nest 40 such that its spring-side is down.

An active fiber should then be prepared for reference measurements and splicing. In the preferred embodiment of the present invention, such preparation involves establishing an approximately 12 mm bare fiber cleave length. The active fiber should then be laid into the reference module 12, shown in FIGS. 2 and 3 and described above, such that the bared end of the active fiber is adjacent the diode-containing portion of the module and the edge of the coating is slightly ($\sim$2-6 mm) on the non-diode side of the center step 30. After the reference module lid 24 is closed, the fiber should be gently slid under the diode cover 22 and toward the diode (not shown) until a resistance due to the coating layer contacting the center stop 30 is felt. This resistance against the center stop indicates that the active fiber end is the proper distance from the reference detector.

Once the active fiber is properly oriented within the reference module 12, the reference measurement may be initiated. In the preferred embodiment, if the measured reference signal is between 0 and $-30$ dBm, that reference signal level is stored until another reference measurement is initiated. An audible and/or visual indication may be activated to signify an acceptable reference signal has been gauged and stored. An alternative type of indication may be activated if the reference signal level is determined to be out of range. However, it should be noted that a more detailed or continuous display of the actual loss values measured may also be provided to the operator in accordance with the present invention. The choice of detail presented in the displayed information may be operator selected based on the particular application involved.

After an acceptable reference signal has been gauged and stored, the fiber ends may be spliced together by the CSL splice located in the splice nest 40. To assist in properly positioning the active fiber end into the CSL splice, after the active fiber is removed from the reference module, the coated portion of the active fiber should be securely placed within the left-hand fiber grip 42. The left-hand fiber grip 42 as referenced herein is the fiber grip nearest the reference module 12 as depicted in FIG. 1. The active fiber should be oriented in the fiber grip 42 such that enough length of the active fiber extends inward through the verification unit to allow the cleaved end length of the active fiber to be properly inserted into a CSL splice being held in splice nest 40.

Upon properly positioning the active fiber end within the splice nest in accordance to the steps set forth above, a somewhat similar seriers of steps is employed to prepare and arrange the non-active fiber portion to be spliced. First, cleave the end of the non-active fiber portion to produce an approximately 12 mm cleave length. Next, insert a coated section of the non-active fiber into the right-hand fiber grip 44. As with the procedure used to orient the active fiber, enough length of the non-active fiber portion should extend inward through the verification unit to allow the cleaved end length of the non-active fiber to also be properly positioned within a CSL splice being held in the splice nest 40.

However, to further assist in arranging the non-active fiber end, the present invention provides an angled fiber guide system 50. As discussed earlier and shown in FIG. 1, the fiber guide 50 extends from the right-hand foam grip 44 toward the splice nest 40. In the preferred embodiment, the cleaved end of the non-active fiber should be placed into the guide 50 at as low an angle as possible and slowly slid along the fiber guide until the non-active fiber end is inserted into a CSL splice. The non-active fiber end should preferably be inserted far enough into the CSL splice to force a portion of the active fiber previously positioned within the splice to be backed out of the splice. Since a portion of the active fiber is secured within the left-hand fiber grip 44, such force against the active fiber end within the splice causes a bow to be produced along the section of active fiber between the left-hand fiber grip 44 and the splice nest 40. It should also be noted that due to the construction of a CSL splice, the fiber contact may be visually observed through a CSL splice housing lens.

With both fiber ends with the CSL splice, verify that bows exist in both the active and non-active fiber sections adjacent the splice. Next, securely close the housing cover assembly 38. In accordance with the preferred embodiment of the present invention, complete closure of the housing cover assembly 38 acts to engage the splice spring within the CSL splice (not shown). The splice spring within a CSL splice is the actual mechanism used to apply adequate forces to each fiber end to establish and maintain a reliable, low-loss optical splice between the two fiber portions being spliced. In addition to engaging the CSL splice spring, the closing of the cover assembly 38 also activates a preferably magnetic switching assembly 54 which initiates the light loss measurement procedures upon complete closure of the cover assembly.

To actually perform the optical loss measurement the preferred embodiment of the present invention incorporated a diode-based optical detection unit on the non-active fiber side of the CSL splice. However, due to the unique configuration of the CSL splice, light which leaks from the splice does not escape from the splice in a predictable manner. To the contrary, due to the many edges and surfaces within a CSL splice, it has been identified that scattered light may be deflected within the splice a number of times before exiting the splice. Therefore, the present invention further comprises a light pipe 58 located immediately adjacent the non-active fiber end, or output end, of the CSL splice. The light pipe 58 is constructed to capture and direct all lost light from the CSL splice into the optical detection unit 60. The present invention's use of a light pipe 58 to direct or transfer captured scattered light from the splice to a specific detection area, allows a photodetector having a smaller active area to be used since some degree of control over the scattered light has been obtained. Such capturing capability is essential for accurate splice loss measurement given the construction of a CSL splice. Furthermore, it should be noted that the specifics of the optical detection unit utilized to actually measure the amount of lost light captured may be any well-known optical detection system.

Figure 4:
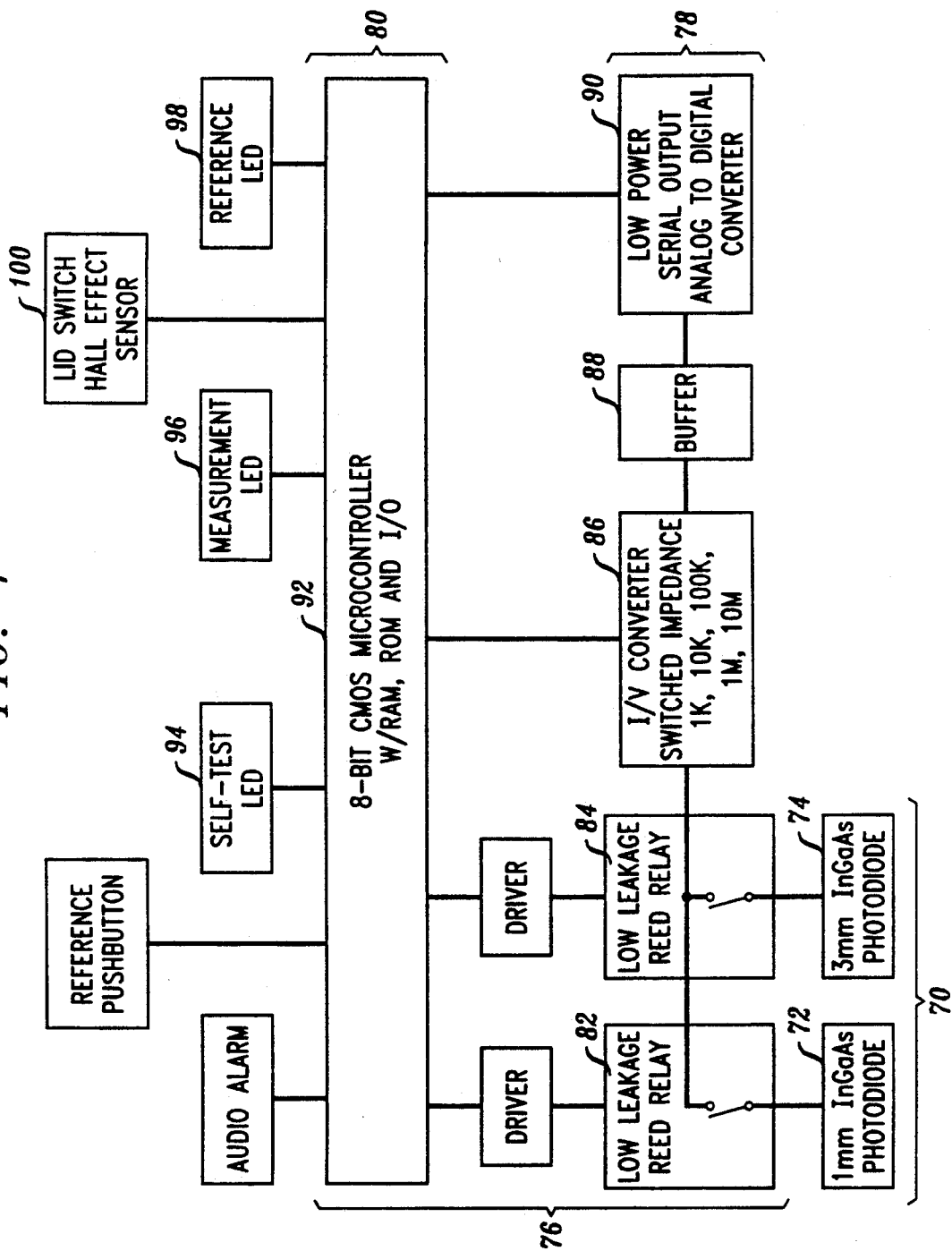
FIG. 4 is a block diagram of the electrical components within the verification system of the present invention.

From an electronics perspective and as illustrated in FIG. 4, the preferred embodiment of the present invention basically comprises three subassemblies which collectively provide field measurement data regarding the amount of light loss within a CSL splice. In general, the electronics are used to convert optical signals to electrical signals, process those signals and provide measurement and control information to the user. Preferably, the entire verification unit is battery operated, lightweight and designed to withstand shock and typical field temperature extremes.

The first of these electronic subassemblies is referred to herein as the detector assembly and is generally identified as element 70 in FIG. 4. In the preferred embodiment, the detector assembly 70 comprises two photodiodes 72 and 74, namely, a reference detector 72 and a scattered light detector 74 The reference detector 72 provides a reference light power level as a base point for subsequent comparisons with the scattered loss measurement, whereas the scattered light detector 74 provides a measurement of the amount of light energy which is not transmitted completely through the CSL splice in the previously non-active fiber portion. Since, as discussed before, particularly in a CSL splice, this lost light energy is non-uniform in both intensity and geometry, a relatively large (3 mm) active area detector, in conjunction with the previously described light pipe, is preferably used to capture, direct, and quantify the last energy scattered by the splice. In the preferred embodiment, the reference detector 72 incorporates a 1 mm InGaAs photodiode.

The InGaAs-type photodiodes were selected for their higher responsivity, or quantum efficiency, and their higher shunt resistance in anticipation of expected use in high ambient temperature environments. In general, the output of the photodiodes is a current which is linear over several decades of operation. Furthermore, the present embodiment may incorporate an algorithm to compensate for the shunt impedance variation of the detectors with temperature.

The second of two electronic subassemblies is referred to herein as the main electronics control board 76. In general, the main control board 76 is essentially an application-specific optical power meter and in accordance with the preferred embodiment, may be functionally divided into three (3) sections: 1) the analog signal processing section 78; 2) the digital microprocessor control and calculation section 80; and 3) the power supply section.

The analog signal processing section 78 preferably consists of two (2) low-leakage reed-relays 82 and 84, a precision chopper-stabilized amplifier 86, and a unit-gain buffer 88. The signal received from the photodiodes, either the 1 mm reference detector or the 3 mm scattered light detector, is switched to the input of the transimpedance amplifier 86. Preferably, the transimpedance amplifier 86 is a switched-gain I/V converter with five (5) ranges: 1V/mW, 1V/100 $\mu$W, 1V/10 $\mu$W, 1V/1 $\mu$W and 1V/100 nW. A low input bias current, low input offset voltage, chopper stabilized operational amplifier, such as TI TLE2652, is used to minimize errors due to temperature effects.

Furthermore, the non-inserting voltage follower 88 is used to buffer 88 the output of the transimpedance amplifier. A low input offset voltage amplifier may be used for this function. Specifically, the output of the buffer is low-pass filtered with a simple R-C, first-order filter designed to provide a 6-dB bandwidth of approximately 16 Hz.

The digital/microprocessing and calculation section of the control board subassembly 80 processes the output of the buffer. Specifically, the output of the buffer 88 is fed into a 16-bit, low-power, delta-sigma, serial output, analog-to-digital converter 90 (ADC). The ADC 90 is preferably controlled by an 8-bit CMOS microcontroller 92.

In the preferred embodiment, the microcontroller 92 utilized in the verification system is an industry standard CMOS 8-bit controller such as an 8751. This controller 92 operates at a 12-mHz clock frequency, has four (4) 8-bit general purpose I/O ports, a universal asynchronous receiver-transmitter (UART) and low power operating modes. The microcontroller 92 controls the detector relays 82 and 84, the gain of the transimpedance amplifier 86, the ADC 90, the front panel light-emitting-diodes (LEDs) 94, 96 and 98 and switches. Splice loss calculations may be performed internally in the microcontroller 92 using floating point libraries bundled with a complier.

The power supply section (not specifically shown) of the control board preferably includes a five (5) volt, low-voltage-drop, regulator and a minus five ($-5$) voltage inserter or charge pump. The voltage regulator, which may be a National 2531, provides a low-battery function, low-voltage cut-off function and battery reversal protection. The regulator will source approximately 100 mA of current at +5 V with only 300 mV input-to-output voltage differential. Six (6) AA-type alkaline batteries, wired in series, will provide a terminal voltage which varies from 9.0 volts (1.5 V/cell times 6 cells) when fully charged to approximately 5.4 volts (0.9 V/cell times 6 cells) when completely discharged. Thus the verification system is designed to work over the full operating voltage of the battery pack. While the specific power supply arrangement set forth above is the presently preferred configuration, it should be noted that any well known battery drive supply system may be utilized within the scope of the present invention.

The third electronic subassembly of the verification system is the Hall-Effect Switched Assembly 100. A Hall-effect switch, such as a Microswitch 594S, is utilized to respond to the proximity of a magnetic field as a means for sensing that the main covering assembly 38 of the verification unit 10 is closed. By assuring that the unit is properly closed prior to beginning testing, no ambient light will be present to give false indication of scattered lost light power levels.

It is to be understood that the above-described arrangements are simply illustrative of the invention. Other arrangements may be devised by those skilled in the art which will embody the principles of the invention and fall within the spirit and scope thereof.

We claim:

1. An optical fiber splice verification system which comprises:

a reference power module for establishing a reference signal level by measuring the level of signal being transmitted by an active fiber at the point an optical splice is desired;

a photodetection area free of substantially all ambient light, and capable of encasing an optical splice, for capturing scattered light escaping from the optical splice, wherein the photodetection area enclosing the optical splice is easily accessible via a hinged cover arrangement which when closed preserves the integrity of the ambient light-free environment;

a photodetector element within the photodetection area for measuring the level of scattered light within the photodetection area; and means for correlating the reference signal level with the scattered light level lost from the optical splice to verify the efficiency of the optical splice.

2. The verification system of claim 1 wherein the reference power module comprises:

a photodetection area free of substantially all ambient light;

a photodetector element within the photodetection area for measuring the level of signal being emitted from the active fiber; and a fiber guide for supporting and aligning the end of the active fiber in a predetermined position relative to the photodetector element.

3. The verification system of claim 2 wherein the photodetector element for measuring the signal level emitted by the active fiber is a photodiode having a 1 mm active area.

4. The verification system of claim 1 wherein the means for capturing scattered light from the optical splice comprises a light pipe which captures light scattered outside the optical splice and directs the captured scattered light to the photodetector element.

5. The verification system of claim 4 wherein the photodetector element for measuring the level of scattered light escaping the optical splice is a photodiode having a 3 mm active area.

6. The verification system of claim 1 further comprising means for accepting an opened optical splicing device capable of receiving two optical fiber ends.

7. The verification system of claim 6 further comprising means for closing the optical splicing device thereby securely splicing the two fiber ends together.

8. A method of verifying the efficiency of an optical fiber splice comprising the steps of:

establishing a reference signal level by measuring the level of signal being transmitted through an active fiber at the point an optical splice is desired;

inserting the active fiber end into an optical fiber splicing device after establishing a reference signal level then closing the splicing device thereby securely splicing two fiber ends together measuring the level of scattered light escaping from the optical splice; and correlating the reference signal level with the scattered light level lost from the optical splice to verify the efficiency of the optical splice.

9. The verifying method of claim 8 wherein the scattered light measurement is performed in a photodetection area which is free of substantially all ambient light.

10. The verifying method of claim 8 wherein a light pipe captures light scattered outside the optical splice and directs the captured scattered light to the photodetection area.

* * * * *